US007242957B2

(12) United States Patent
Tayloe et al.

(10) Patent No.: US 7,242,957 B2
(45) Date of Patent: Jul. 10, 2007

(54) METHOD OF SELECTIVE NEED-BASED CONTROL MESSAGE AUGMENTATION

(75) Inventors: Daniel R. Tayloe, Phoenix, AZ (US); Jonathan H. Gross, Gilbert, AZ (US); Shawn W. Hogberg, Chandler, AZ (US)

(73) Assignee: Motorola, Inc., Schaumburg, IL (US)

( * ) Notice: Subject to any disclaimer, the term of this patent is extended or adjusted under 35 U.S.C. 154(b) by 5 days.

(21) Appl. No.: 11/204,486

(22) Filed: Aug. 15, 2005

(65) Prior Publication Data

US 2007/0036107 A1    Feb. 15, 2007

(51) Int. Cl.
*H04B 7/00* (2006.01)
(52) U.S. Cl. .................. 455/522; 455/69; 370/331
(58) Field of Classification Search ........... 455/442, 455/436, 441, 452.1, 455, 522, 69, 524–526; 370/331
See application file for complete search history.

(56) References Cited

U.S. PATENT DOCUMENTS

| | | | |
|---|---|---|---|
| 5,056,109 A | 10/1991 | Gilhousen et al. | |
| 6,272,354 B1 | 8/2001 | Saario | |
| 6,366,778 B1 | 4/2002 | Bender et al. | |
| 6,622,023 B2 * | 9/2003 | Chheda | 455/522 |
| 6,654,608 B1 | 11/2003 | Monell et al. | |
| 6,708,041 B1 | 3/2004 | Butovitsch et al. | |
| 6,839,567 B2 | 1/2005 | Ozluturk et al. | |
| 6,908,357 B2 * | 6/2005 | Pelletier | 455/436 |
| 2003/0174676 A1 | 9/2003 | Willenegger et al. | |
| 2004/0142692 A1 * | 7/2004 | Schwarz et al. | 455/442 |

FOREIGN PATENT DOCUMENTS

EP    0994576 A2    4/2000

* cited by examiner

*Primary Examiner*—Matthew Anderson
*Assistant Examiner*—Angelica M. Perez

(57) ABSTRACT

A method of selective need-based control message augmentation may include a network unit of a mobile communication system (100) generating a control message (250) for communication to a mobile unit (202), determining a handoff state transition of the mobile unit, and determining a set of signal conditions for one or more legs of an active set associated with the mobile unit. Further, the network unit at least one of selectively fast repeating the control message and selectively increasing the power gain for the control message based on the handoff state transition and the set of signal conditions.

16 Claims, 4 Drawing Sheets

METHOD OF SELECTIVE NEED-BASED CONTROL MESSAGE AUGMENTATION

BACKGROUND OF INVENTION

In a CDMA system, there is a strong relationship between system capacity, RF power, interference, and call quality. As call quality is increased, the power consumed by the system tends to increase. This situation consumes limited available cell power and increases system interference, which in turn reduces system capacity from an RF perspective. This is a particularly important aspect of efficient CDMA systems.

Call quality in this context includes voice quality which can be measured by frame erasure rate; mean opinion score (MOS score) which is a measure of voice quality; data throughput for data services; and call reliability which includes call setup success rate and the dropped call rate. This relationship is well known to those skilled in the art. Therefore, there is a fundamental tradeoff between call performance (FER/quality, call reliability, and messaging reliability) and system capacity. As the link performance is increased FER is typically lowered, additional power is consumed, interference is generated, and capacity is reduced.

For establishing and maintaining voice communication between cellular users, control or signaling messaging is required. A traffic channel carries, among other things, voice packets of each person speaking as well as signaling and control messaging such as handoff related messaging for a cellular subscriber moving from one cell to another. While the prior art focuses on boosting certain types of control messages, the prior art fails to distinguish between circumstances in which a certain type of control message may or may not be boosted.

Control messages must be reliably transmitted in a fast manner in order to achieve good call performance, that is, a low dropped call rate and low noise RF traffic channels. One method to increase such call performance is to quickly or rapidly repeat certain call critical messages. Quick repeating is a process of sending the same message multiple times in rapid succession in order to increase the likelihood that a particular message will be received reliably by the mobile unit.

Existing communications that address this problem provide a static mechanism for quickly repeating call critical control messages. These methods do not take into account voice quality impacts or data throughput. Existing methodology may quickly repeat critical messages in a static fashion, but this typically has a negative impact on voice quality.

Accordingly, it would be desirable to have a method of selective need-based control message augmentation not found in the prior art.

BRIEF DESCRIPTION OF THE DRAWINGS

Representative elements, operational features, applications and/or advantages of the present invention reside inter alia in the details of construction and operation as more fully hereafter depicted, described and claimed—reference being made to the accompanying drawings forming a part hereof, wherein like numerals refer to like parts throughout. Other elements, operational features, applications and/or advantages will become apparent in light of certain exemplary embodiments recited in the Detailed Description, wherein:

Elements in the Figures are illustrated for simplicity and clarity and have not necessarily been drawn to scale. For example, the dimensions of some of the elements in the Figures may be exaggerated relative to other elements to help improve understanding of various embodiments of the present invention. Furthermore, the terms "first", "second", and the like herein, if any, are used inter alia for distinguishing between similar elements and not necessarily for describing a sequential or chronological order. Moreover, the terms "front", "back", "top", "bottom", "over", "under", and the like in the Description and/or in the Claims, if any, are generally employed for descriptive purposes and not necessarily for comprehensively describing exclusive relative position. Any of the preceding terms so used may be interchanged under appropriate circumstances such that various embodiments of the invention described herein may be capable of operation in other configurations and/or orientations than those explicitly illustrated or otherwise described.

DETAILED DESCRIPTION OF EXEMPLARY EMBODIMENTS

The following representative descriptions of the present invention generally relate to exemplary embodiments and the inventor's conception of the best mode, and are not intended to limit the applicability or configuration of the invention in any way. Rather, the following description is intended to provide convenient illustrations for implementing various embodiments of the invention. As will become apparent, changes may be made in the function and/or arrangement of any of the elements described in the disclosed exemplary embodiments without departing from the spirit and scope of the invention.

For clarity of explanation, the embodiments of the present invention are presented, in part, as comprising individual functional blocks. The functions represented by these blocks may be provided through the use of either shared or dedicated hardware, including, but not limited to, hardware capable of executing software. The present invention is not limited to implementation by any particular set of elements, and the description herein is merely representational of one embodiment.

Software blocks that perform embodiments of the present invention can be part of computer program modules comprising computer instructions, such control algorithms that are stored in a computer-readable medium such as memory. Computer instructions can instruct processors to perform any methods described below. In other embodiments, additional modules could be provided as needed.

A detailed description of an exemplary application is provided as a specific enabling disclosure that may be generalized to any application of the disclosed system, device and method for selective need-based control message augmentation in accordance with various embodiments of the present invention.

Figure 1:
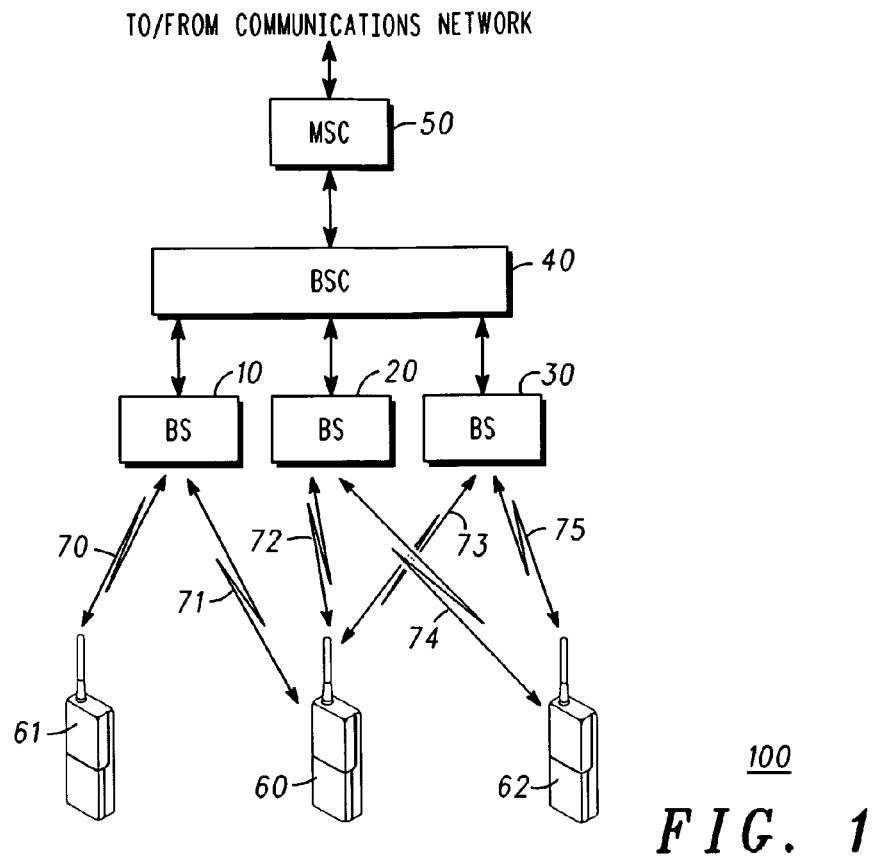
FIG. 1 representatively illustrates a block diagram of a mobile communication system in accordance with an exemplary embodiment of the present invention.

FIG. 1 representatively illustrates a block diagram of a mobile communication system in accordance with an exemplary embodiment of the present invention. The mobile communication system 100 which embodies the present invention may include a CDMA (Code Division Multiple Access), TDMA (Time Division Multiple Access), GSM (General System Mobile), UMTS (Universal Mobile Telecommunication System) or other such cellular based communication systems. Mobile communication system 100 includes mobile switching center (MSC) 50 coupled to base station controller (BSC) 40. Base station controller 40 is coupled to base stations (BTS) 10, 20 and 30. Base stations 10-30 may be coupled to mobile units 60, 61, and 62.

Each mobile unit 60-62 is coupled to at least one of the base stations 10-30. Mobile unit 60 is coupled to each base station 10-30 via wireless links 71, 72 and 73 respectively. Each of these wireless links may also be referred to as "legs" or "soft handoff legs". Mobile unit 60 is coupled to each of the base stations 10-30 since it is in "soft-handoff" (SHO) with these base stations (and thus has multiple soft-handoff legs). The base stations are constantly transmitting the same data for diversity benefits. Within a call, base stations or soft-handoff legs may be dropped and others may be added. In this specification, reference is made to altering behavior based on the number of call legs (the handoff state) and with respect to adding or dropping call legs. A call leg may be either a soft or softer handoff leg, and the invention is not restricted to one particular type of soft/softer handoff to the exclusion of any other type.

Mobile unit 61 is coupled via wireless link 70 only to base station 10, since no soft-handoff is involved. Mobile unit 61 is in a one-way handoff state since there is only one base station in communication with mobile unit 61. Mobile unit 62 is also in soft-handoff since it is coupled to base stations 20 and 30 via wireless links 74 and 75 respectively.

The base stations 10-30 control the power with which the mobile units 60-62 send data on a reverse link. Similarly, mobile units 60-62 control the power of signals transmitted by base stations 10-30 for data transmitted on a forward link.

The power transmitted by mobile units 60-62 is of critical importance since this power is typically supplied by batteries. Transmit power is controlled on both the forward and reverse channels. That is, the base station controls the power which the mobile unit transmits data to the base station and the mobile unit controls the power which the base station transmits data to the mobile unit.

In a CDMA-based cellular system 100, BTSs 10-30 respond to power control commands from the mobile units, or from the Base Station Controller 40, in order to maintain a target frame erasure rate to the mobile units 60, 61, or 62. The total amount of power transmitted by each BTS 10-30 is therefore dependent on the link conditions to each mobile unit, and the amount of traffic load (the number of mobile units and their associated soft handoff legs) that each BTS is carrying.

Each BTS may have one or more sectors. Each sector may have one or more RF carriers (channels) servicing traffic.

Fundamental to a wireless communication system is the ability to maintain established communication connections while a mobile unit moves in and between coverage areas. In order to maintain established communication connections, 'soft-handoff' techniques have been developed for code division multiple access (CDMA) communication systems whereby a mobile unit is in concurrent, active communication with multiple BTSs. Each BTS in active communication with the mobile unit is a member of an 'active set' of the mobile unit and transmits bearer traffic to, and receives bearer traffic from, the mobile unit. As the mobile unit moves through the communication system, BTSs are added to, or deleted from, the mobile unit's active set so as to assure that the mobile unit will always be in communication with at least one BTS.

As an example of an embodiment, mobile communication system 100 may further include a mobile unit 62 that concurrently is in active communication with each of BTS 20 and 30. That is, mobile unit 62 is in 'soft-handoff' with each of BTSs 20 and 30 and each of BTS 20 and BTS 30 is a member of an 'active set' of mobile unit 62. As members of the active set of mobile unit 62, each of BTSs 20 and 30 concurrently maintains a respective wireless link 74, 75 with the mobile unit 62. Each link 74, 75 includes a respective forward link for conveyance of signals to mobile unit and a respective reverse link for receipt of signals from the mobile unit.

Each BTS 20, 30 in the active set of mobile unit 62 conveys the same bearer traffic to, and receives the same bearer traffic from, the mobile unit 62. By providing multiple BTSs that concurrently convey same signals to, and receive same signals from mobile unit 62, mobile communication system 100 enhances the likelihood that the mobile unit will receive an acceptable quality signal from BTS 20, 30 and that the BTS 20, 30 will receive an acceptable quality signal from the mobile unit. For example, when each of BTSs 20 and 30 receives a same frame from mobile unit 62, the BTS determines whether the received frame is acceptable or erroneous and forwards the frame, and an accompanying indicator of whether the frame is acceptable, that is, good, or erroneous, that is, erased, to BSC 40.

As mobile unit 62 heads towards a coverage area, or sector, associated with a new BTS, signal strength of a pilot signal received by mobile unit 62 from the new BTS increases until mobile unit 62 identifies the pilot signal from the new BTS as a viable communication link. In this instance, mobile unit 62 may then request that mobile communication system 100 add the new BTS to the active set (handoff add). In addition, as mobile unit 62 heads away from a coverage area, or sector, associated with a BTS in the active set, a signal strength of a pilot signal received by mobile unit 62 from a BTS in the active set may deteriorate to the point that mobile unit 62 determines that communication with that BTS is no longer a viable communication link. Mobile unit then requests that mobile communication system 100 drop the fading BTS from the active set. Typically, the request to add or drop a BTS is conveyed by the mobile unit via a Pilot Strength Measurement Message (PSMM).

One method to decrease the number of dropped calls and call set up failures in a mobile communication system is to increase the reliability of the critical signaling messages in the system, such as call set up messages and handoff messages. This reliability can be increased by either performing a fast repeat of the messages or by boosting the power of messages or both. Fast repeating a message has the potential down side of interrupting audio, resulting in reduced audio quality, while boosting the power has the down side of reducing the capacity of the system.

Since both of these have negative side effects, it is desirable to limit the application of these techniques. This can be done in several different ways, one of which is to recognize that not all legs in a call contribute equally to the total signal at the mobile. Some legs will be received at a greater signal level than others. Since weak legs have a lesser probability of delivering a message than a stronger leg, it makes sense to spend system power boosting the messages on the stronger legs more than on the weaker legs. This helps to reduce the capacity (power) cost of boosting signaling messages.

In addition, it is recognized that some situations in the life of a call have a higher probability of failure than others. Once such example is when a call is in one way soft hand off trying to add a second leg. This case is particularly prevalent at the start of a call when the mobile may not have started the call on the best site. In this case, extra power and/or repeats should be spent to speed the process of getting the second soft hand off leg established, thus decreasing the probability that the call will drop.

Likewise, there may be cases where the mobile is in at least two way soft handoff and all current pilot signals are strong. In such a case, it is unnecessary to spend extra power to get the next soft handoff established more quickly, since the mobile is in no current danger of dropping the call. In fact, less power than normal can be spent on boosting signaling messages in this situation. Thus power can be conserved in this case.

In essence, it is beneficial to spend power in specific cases that improve call drop and call set up failures and not spend power when it either does not help, or will help only marginally.

Figure 2:
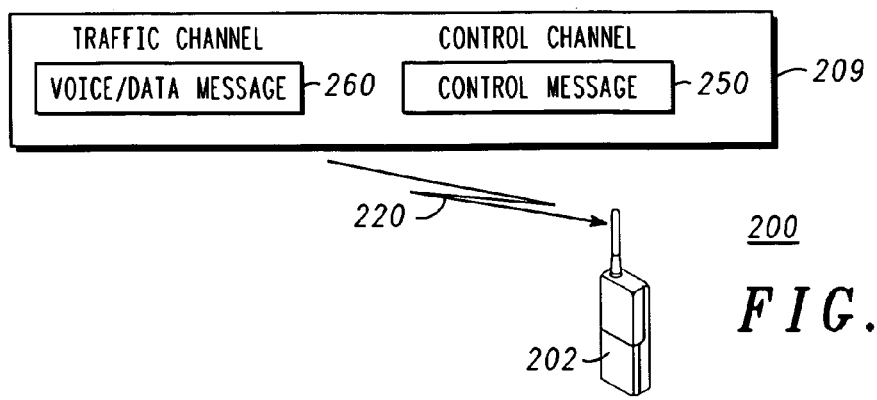
FIG. 2 representatively illustrates a block diagram of mobile communication messages in accordance with an exemplary embodiment of the present invention.

FIG. 2 representatively illustrates a block diagram of mobile communication messages in accordance with an exemplary embodiment of the present invention. A network unit 209 of a mobile communication system, for example a cellular communication system 200, is shown communicatively coupled to mobile unit 202 via wireless link 220. In an embodiment, network unit 209 may be at least one of a base station 10-30 or a base station controller 40.

In cellular communication systems, voice/data message traffic 260 may be carried over a traffic channel, while over the air control messages 250 may be sent using a dedicated control channel or performed "in-band". Use of "in-band" control signaling occurs when bits or entire frames are "stolen" from the traffic channel, which is used to carry the voice or data, in order to carry the necessary control messages. For example, in a cellular communication system, handoff direction messages, power control parameter messages, neighbor list updates, etc. may be sent to a mobile unit "in-band" on a traffic channel. If this "in-band" messaging occurs too frequently, it can negatively impact the voice quality of the traffic channel since bits are being omitted from a speech stream in order to carry signaling or control messages.

Control messages 250 may be fast repeated to insure that they are received from the communication system, specifically the base station transceiver, to the mobile unit 202, for example. Although as mentioned above, fast repeating a message has the potential down side of interrupting audio, resulting in reduced audio quality.

Fast repeats are the transmission of the same message multiple times. This can be done to improve the probability of the message actually getting over the air interface successfully in adverse RF conditions. In cellular systems, frames transmitted over the air can be erased. In some cases, it is critical to get signaling over the air reliably and quickly, for example, when executing handoffs. Therefore, it is desirable to quickly ("fast") send multiple copies of the same message to the mobile (w/o even waiting for an acknowledgment of the first message). This is referred to as "fast repeats". By sending multiple copies of the same message in rapid succession, the probability of the message getting to the mobile both quickly and reliably is improved.

In an exemplary embodiment, when executing a CDMA soft handoff, consider the following. Suppose the call is in one-way handoff, meaning the mobile unit is communicating with only a single base station. In this case, there is no spatial diversity in the call, so the call is more vulnerable to fades and RF blocking since it has only an active traffic channel to only a single base station. Now suppose the mobile is moving down the road and gets close enough to a second base station where the mobile realizes it should add this second base station to the call (i.e. execute a soft handoff), which will improve the overall link conditions by adding a second good leg (over the air interface) to the call to a second base station, which will provide spatial diversity for the call (much less susceptibility to RF fades, shadowing, etc.).

Typically a fast repeat of the hand off message would be sent. That is, the communication system would send the original hand off message plus one rapidly repeated copy. The mobile communication system may send a hand off direction message to the mobile unit commanding mobile unit to add the second link or leg through the BTS to the call. In this case, for example, it would be desirable to send three copies of the same hand off direction message to the mobile unit in rapid succession.

Figure 3:
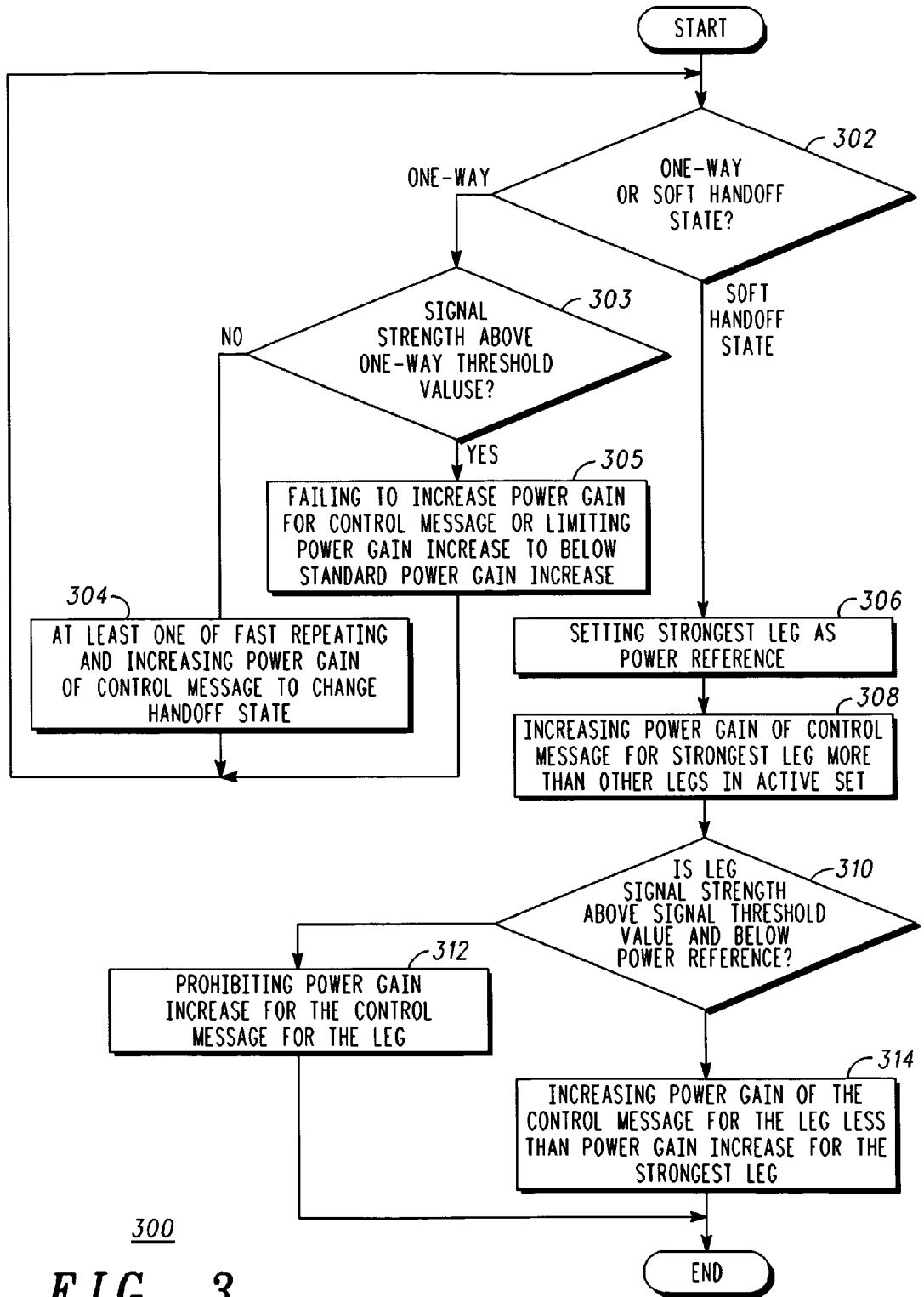
FIG. 3 representatively illustrates a flow diagram of a method of the invention in accordance with an exemplary embodiment of the present invention.

FIG. 3 representatively illustrates a flow diagram 300 of a method of the invention in accordance with an exemplary embodiment of the present invention. In step 302, either prior to or at substantially the same time as a network unit generating a control message for communication to a mobile unit, it is determined if a call between a mobile unit and mobile communication system is in a one-way or a soft handoff state. If the call is in a one-way handoff state, meaning the mobile unit is only in communication with one base station (only one leg present), then it is determined (in step 303) if the signal strength of the leg is above a one-way threshold value. In an embodiment, one-way threshold value may be any signal strength value for a mobile unit in a one-way handoff scenario that is used to determine whether to boost power gain for a control message on that leg. In an embodiment, one-way threshold value may be −9 db Ec/Io (signal to noise ratio), although this is not limiting of the invention.

If the leg is above the one-way threshold value, power gain increase for a control message on that leg may be prohibited or limited to a power gain below a standard power gain increase in step 305. For example, if signal strength of leg is above −9 db Ec/Io, and a standard power gain increase is 3 db, power gain for a control message on the leg may be prohibited or limited to a value below 3 db. These values are not limiting of the invention and any values of one-way threshold or standard power gain increase are within the scope of the invention.

If signal strength of the leg is below the one-way threshold value and other pilot signals are detected, then the power gain may be increased for transmission of the control message to the mobile unit, and/or the control message may be fast repeated a plurality of times to ensure the control message is received by the mobile unit for a control message that changes the handoff state per step 304. For example and without limitation, the power gain may be increased, and/or the control message fast repeated when the control message is a handoff message adding a leg such that the handoff state is modified from a one-way handoff state to a soft handoff state with multiple call legs. In an embodiment, this can occur for a new call where the call is initiated using one leg, but an additional leg is being added. This helps ensure that the new call will not be dropped.

If the call is in a soft handoff state per step 302, then out of the active set of legs in the call, the strongest leg may be set as a power reference. In other words, of the plurality of legs in the active set of the call, the leg with the strongest signal may be selected a power reference (i.e. the strength of the signal of the strongest leg is set as the power reference) per step 306. In step 308, for transmission of the control message to the mobile, the power gain of the strongest leg in the active set is increased more than any power gain increase for other legs in the active set.

In an embodiment, a signal threshold value may be set by a system administrator, user, software algorithm, and the like. The signal threshold value may define the signal strength of a leg in the active set, where if the signal strength of a leg falls below the signal threshold value (for example and without limitation 6 db, and the like) a power gain increase is prohibited for that leg for transmission of the control message.

In step 310 it is determined for each leg in the active set, except for the strongest leg, if the leg has a signal strength (in db for example) that is above the signal threshold but below the power reference. If not, by default, the signal strength of the leg is below the signal threshold value and a power gain increase for transmission of the control message for that leg is prohibited per step 312. If the signal strength of the leg does fall above the signal threshold value and below the power reference, the power gain of that leg may be increased for transmission of the control message per step 314. However, the power gain increase is less than the power gain increase for the strongest leg per step 308. Steps 310-314 may be repeated for each leg in the active set.

In one embodiment, for each of the legs in the active set that have a signal strength above the signal strength threshold but below the power reference (per step 314), the power gain may be increased by substantially the same amount. In another embodiment, the power gain increase for each leg may be substantially in proportion to the leg's signal strength in excess of the signal threshold value, or the leg's signal strength below the power reference. In other words, the power gain increase for each leg may depend upon the signal strength of the leg above the signal strength threshold and/or below the power reference.

In still another embodiment, a plurality of power gain ranges may be established between the power reference and the signal threshold value such that each of the plurality of legs may be placed in one of the plurality of power gain ranges based on at least one of the leg's signal strength above the signal threshold value or the leg's signal strength below the power reference. Further, the power gain increase may be substantially the same for each leg in a power gain range. In other words, for each of the legs in an active set that meet the criteria of step 312, each of the legs is placed in one of a plurality of power gain ranges based on the signal strength of the leg relative to at least one of the power reference and/or the signal threshold value. For a given power gain range and for each of the legs placed into that power gain range, the power gain increase is substantially the same. The power gain for each of the power gain ranges may be different from each other. So instead of increasing the power gain for each leg in proportion to its signal strength as in the previous embodiment, the power gain increase is substantially the same for legs having a signal strength within a given range relative to at least one of the power reference (based on the strongest leg) and/or the signal threshold value.

Figure 4:
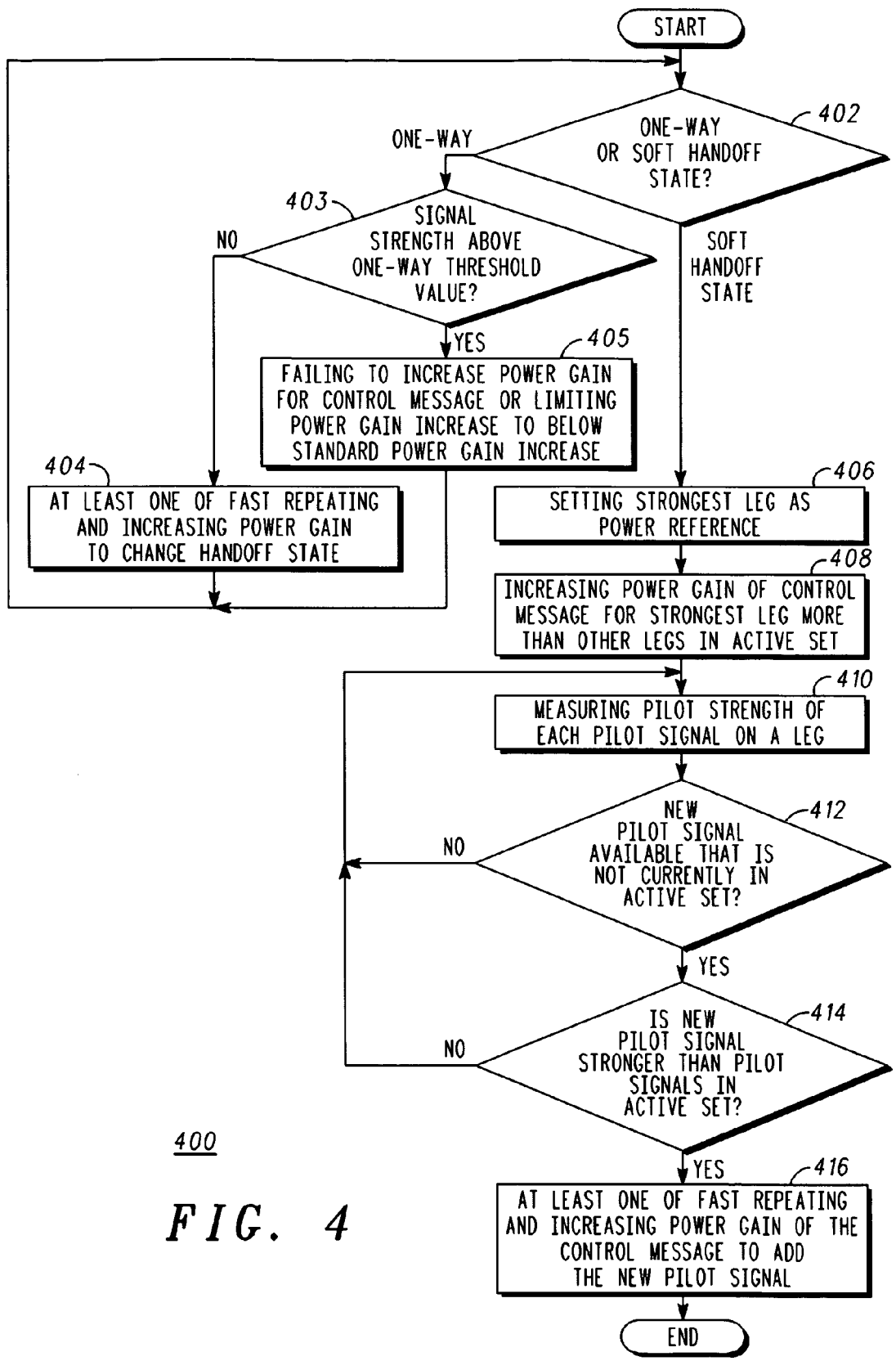
FIG. 4 representatively illustrates a flow diagram of a method of the invention in accordance with another exemplary embodiment of the present invention.

FIG. 4 representatively illustrates a flow diagram 400 of a method of the invention in accordance with another exemplary embodiment of the present invention. In step 402, either prior to or at substantially the same time as a network unit generating a control message for communication to a mobile unit, it is determined if a call between a mobile unit and mobile communication system is in a one-way or a soft handoff state. If the call is in a one-way handoff state, meaning the mobile unit is only in communication with one base station (only one leg present), then it is determined (in step 403) if the signal strength of the leg is above a one-way threshold value. In an embodiment, one-way threshold value may be any signal strength value for a mobile unit in a one-way handoff scenario that is used to determine whether to boost power gain for a control message on that leg. In an embodiment, one-way threshold value may be −9 db Ec/Io, although this is not limiting of the invention.

If the leg is above the one-way threshold value, power gain increase for a control message on that leg may prohibited or limited to a power gain below a standard power gain increase in step 405. For example, if signal strength of leg is above −9 db Ec/Io, and a standard power gain increase is 3 db, power gain for a control message on the leg may be prohibited or limited to a value below 3 db. These values are not limiting of the invention and any values of one-way threshold or standard power gain increase are within the scope of the invention.

If signal strength of the leg is below the one-way threshold value and other pilot signals are detected, then the power gain may be increased for transmission of the control message to the mobile unit, and/or the control message may be fast repeated a plurality of times to ensure the control message is received by the mobile unit for a control message that changes the handoff state per step 404. For example and without limitation, the power gain may be increased, and/or the control message fast repeated when the control message is a handoff message adding a leg such that the handoff state is modified from a one-way handoff state to a soft handoff state with multiple call legs. In an embodiment, this can occur for a new call where the call is initiated using one leg, but an additional leg is being added. This helps ensure that the new call will not be dropped.

If the call is in a soft handoff state per step 402, then out of the active set of legs in the call, the strongest leg may be set as a power reference. In other words, of the plurality of legs in the active set of the call, the leg with the strongest signal may be selected a power reference (i.e. the strength of the signal of the strongest leg is set as the power reference) per step 406. In step 408, for transmission of the control message to the mobile, the power gain of the strongest leg in the active set is increased more than any power gain increase for other legs in the active set.

Out of the active set of legs in the call, the pilot strength of each pilot signal is measured in step 410. In step 412, it is determined if a new pilot signal not currently in the active set is available. If so, it is determined if the new pilot signal is stronger than one or more of the pilot signals currently in the active set in step 414. In another embodiment, in step 414 it is determined if the new pilot signal is stronger than each pilot signal currently in the active set. If so, at least one of increasing the power gain for the control message and/or fast repeating the control message to add the new pilot signal to the active set per step 416. If there is not a new pilot signal available per step 412 or the new pilot signal is not stronger than each of the pilot signals in the active set, then the process returns to step 410.

Figure 5:
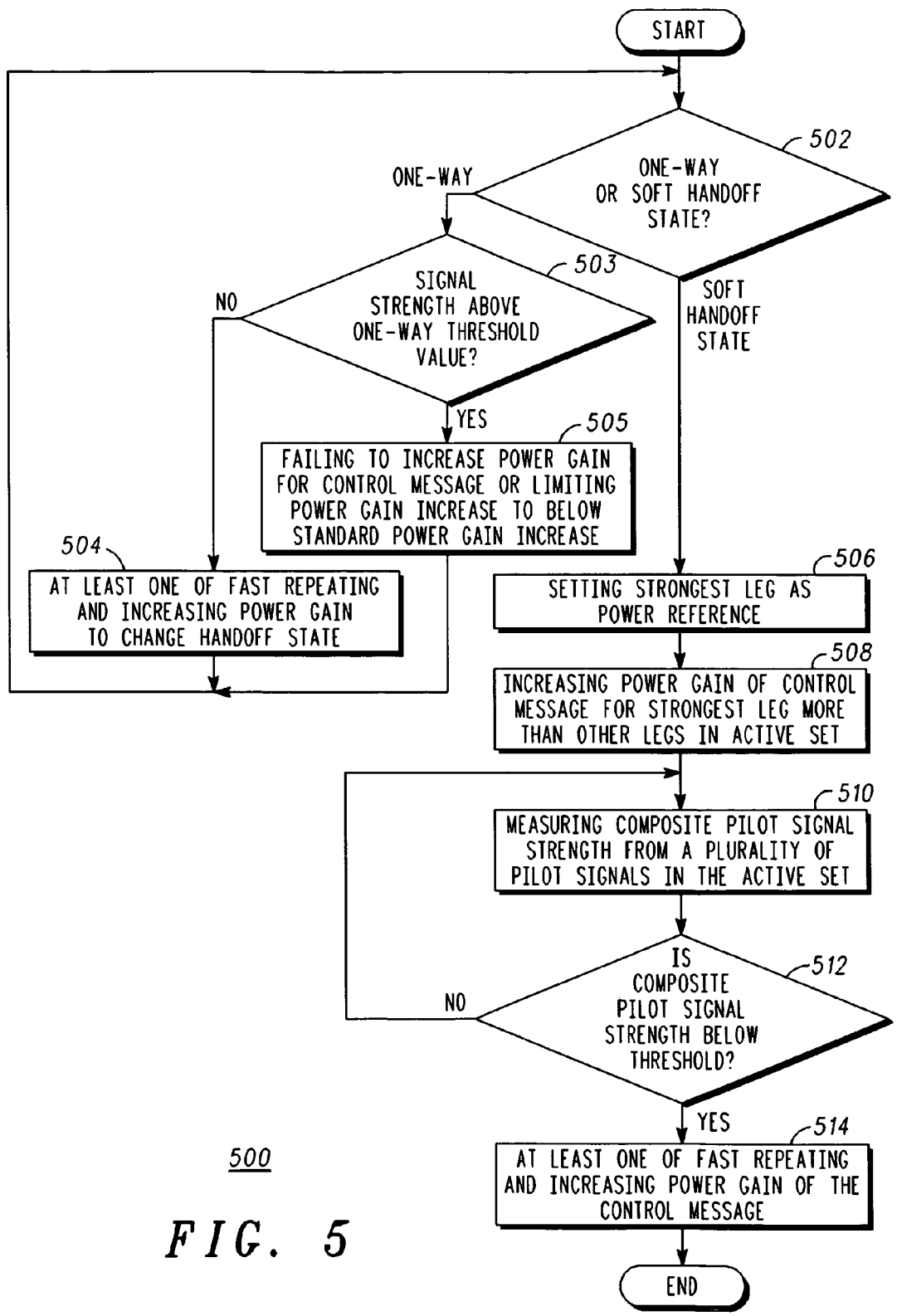
FIG. 5 representatively illustrates a flow diagram of a method of the invention in accordance with yet another exemplary embodiment of the present invention.

FIG. 5 representatively illustrates a flow diagram 500 of a method of the invention in accordance with yet another exemplary embodiment of the present invention. In step 502, either prior to or at substantially the same time as a network unit generating a control message for communication to a mobile unit, it is determined if a call between a mobile unit and mobile communication system is in a one-way or a soft handoff state. If the call is in a one-way handoff state, meaning the mobile unit is only in communication with one base station (only one leg present), then it is determined (in step 503) if the signal strength of the leg is above a one-way threshold value. In an embodiment, one-way threshold value may be any signal strength value for a mobile unit in a one-way handoff scenario that is used to determine whether to boost power gain for a control message on that leg. In an embodiment, one-way threshold value may be −9 db Ec/Io, although this is not limiting of the invention.

If the leg is above the one-way threshold value, power gain increase for a control message on that leg may prohibited or limited to a power gain below a standard power gain increase in step 505. For example, if signal strength of leg is above −9 db Ec/Io, and a standard power gain increase is 3 db, power gain for a control message on the leg may be prohibited or limited to a value below 3 db. These values are not limiting of the invention and any values of one-way threshold or standard power gain increase are within the scope of the invention.

If signal strength of the leg is below the one-way threshold value and other pilot signals are detected, then the power gain may be increased for transmission of the control message to the mobile unit, and/or the control message may be fast repeated a plurality of times to ensure the control message is received by the mobile unit for a control message that changes the handoff state per step 504. For example and without limitation, the power gain may be increased, and/or the control message fast repeated when the control message is a handoff message adding a leg such that the handoff state is modified from a one-way handoff state to a soft handoff state with multiple call legs. In an embodiment, this can occur for a new call where the call is initiated using one leg, but an additional leg is being added. This helps ensure that the new call will not be dropped.

If the call is in a soft handoff state per step 502, then out of the active set of legs in the call, the strongest leg may be set as a power reference. In other words, of the plurality of legs in the active set of the call, the leg with the strongest signal may be selected a power reference (i.e. the strength of the signal of the strongest leg is set as the power reference) per step 506. In step 508, for transmission of the control message to the mobile, the power gain of the strongest leg in the active set is increased more than any power gain increase for other legs in the active set.

Out of the active set, measuring a composite pilot strength from a plurality of pilot signals per step 510. Composite pilot strength is the composite strength of the plurality of pilot signals in the current active set. In step 512 it is determined if the composite pilot strength is below a composite pilot threshold, where the composite pilot threshold can be any signal strength determined by one skilled in the art as being a minimum composite pilot strength for an active set for any given set of circumstances. If the composite pilot strength is below the composite pilot threshold, at least one of increasing the power gain for the control message, and/or fast repeating the control message per step 514.

The above embodiments have the advantage of augmenting control messages through increasing the power gain and/or fast repeating only in circumstances where the increase in power gain or fast repeating is needed, and not wasting power and/or capacity boosting control messages in circumstances where increasing the power gain and/or fast repeating is not effective. Increasing power gain and/or fasting repeating only in specific RF scenarios reduces call setup failures and minimizes dropped calls. Further, prohibiting increases in power gain and/or fast repeating under certain RF scenarios (weak handoff legs, and the like) prevents the wasting of power and hence capacity and contributes to improving voice quality.

In the foregoing specification, the invention has been described with reference to specific exemplary embodiments; however, it will be appreciated that various modifications and changes may be made without departing from the scope of the present invention as set forth in the claims below. The specification and figures are to be regarded in an illustrative manner, rather than a restrictive one and all such modifications are intended to be included within the scope of the present invention. Accordingly, the scope of the invention should be determined by the claims appended hereto and their legal equivalents rather than by merely the examples described above.

For example, the steps recited in any method or process claims may be executed in any order and are not limited to the specific order presented in the claims. Additionally, the components and/or elements recited in any apparatus claims may be assembled or otherwise operationally configured in a variety of permutations to produce substantially the same result as the present invention and are accordingly not limited to the specific configuration recited in the claims.

Benefits, other advantages and solutions to problems have been described above with regard to particular embodiments; however, any benefit, advantage, solution to problem or any element that may cause any particular benefit, advantage or solution to occur or to become more pronounced are not to be construed as critical, required or essential features or components of any or all the claims.

As used herein, the terms "comprise", "comprises", "comprising", "having", "including", "includes" or any variation thereof, are intended to reference a non-exclusive inclusion, such that a process, method, article, composition or apparatus that comprises a list of elements does not include only those elements recited, but may also include other elements not expressly listed or inherent to such process, method, article, composition or apparatus. Other combinations and/or modifications of the above-described structures, arrangements, applications, proportions, elements, materials or components used in the practice of the present invention, in addition to those not specifically recited, may be varied or otherwise particularly adapted to specific environments, manufacturing specifications, design parameters or other operating requirements without departing from the general principles of the same.

We claim:

1. In a mobile communication system, a method of selective need-based control message augmentation, comprising:
   a network unit of the mobile communication system generating a control message for communication to a mobile unit;
   if a handoff state transition is in a one-way handoff state:

at least one of fast repeating the control message and increasing power gain for the control message to change from the one-way handoff state to a soft handoff state;

if the handoff state transition is in the soft handoff state:
out of an active set, setting a strongest leg as a power reference;
increasing power gain of the control message for the strongest leg more than other legs in the active set;
establishing a signal threshold value;
prohibiting power gain increase of the control message in a leg in the active set if signal strength of the leg in the active set falls below the signal threshold value; and
increasing power gain of the control message in the leg if signal strength of the leg in the active set is between the power reference and the signal threshold value, wherein power gain increase of the leg is less than the strongest leg.

2. The mobile communication system of claim 1, wherein at least one of fast repeating the control message and increasing the power gain for the control message to change from the one-way handoff state to the soft handoff state occurring for a new call.

3. The mobile communication system of claim 1, further comprising:
out of the active set, measuring a composite pilot strength from a plurality of pilot signals; and
if the composite pilot strength is below a composite pilot threshold, at least one of fast repeating the control message and increasing power gain for the control message.

4. The mobile communication system of claim 1, further comprising:
out of the active set, measuring pilot strength of each pilot signal;
detecting a new pilot signal not currently in the active set, wherein the new pilot signal is stronger than each of the pilot signals in the active set; and
at least one of fast repeating the control message and increasing power gain of the control message to add the new pilot signal to the active set.

5. The mobile communication system of claim 1, further comprising increasing power gain by a substantially same amount for a plurality of legs in the active set having a signal strength between the power reference and the signal threshold value.

6. The mobile communication system of claim 1, further comprising for each of the plurality of legs in the active set having a signal strength between the power reference and the signal threshold value, increasing power gain substantially in proportion to the leg's signal strength in excess of the signal threshold value.

7. The mobile communication system of claim 1, further comprising for each of the plurality of legs in the active set having a signal strength between the power reference and the signal threshold value, increasing power gain substantially in proportion to the leg's signal strength below the power reference.

8. The mobile communication system of claim 1, further comprising:
providing a plurality of power gain ranges between the power reference and the signal threshold value;
placing each of a plurality of legs in the active set in one of the plurality of power gain ranges based on at least one of signal strength above the signal threshold value and signal strength below the power reference; and
increasing power gain by a substantially same amount for the one or more of the plurality of legs in each of the power gain ranges.

9. A method of selective need-based control message augmentation, comprising:
a network unit of a mobile communication system generating a control message for communication to a mobile unit;
determining a handoff state transition of the mobile unit;
determining a set of signal conditions for one or more legs of an active set associated with the mobile unit; and
the network unit at least one of selectively fast repeating the control message and selectively increasing power gain for the control message based on the handoff state transition and the set of signal conditions;
if the handoff state transition is in a one-way handoff state at least one of fast repeating the control message and increasing power gain for the control message to change from the one-way handoff state to a soft handoff state.

10. The method of claim 9, wherein at least one of fast repeating the control message and increasing the power gain for the control message to change from the one-way handoff state to the soft handoff state occurring for a new call.

11. A method of selective need-based control message augmentation, comprising:
a network unit of a mobile communication system generating a control message for communication to a mobile unit;
determining a handoff state transition of the mobile unit;
determining a set of signal conditions for one or more legs of an active set associated with the mobile unit; and
the network unit at least one of selectively fast repeating the control message and selectively increasing power gain for the control message based on the handoff state transition and the set of signal conditions;
if the handoff state transition is in a soft handoff state:
out of the active set, setting a strongest leg as a power reference;
increasing power gain of the control message for the strongest leg more than other legs in the active set;
establishing a signal threshold value;
prohibiting power gain increase of the control message in a leg in the active set if signal strength of the leg in the active set falls below the signal threshold value; and
increasing power gain of the control message in the leg if signal strength of the leg in the active set is between the power reference and the signal threshold value, wherein power gain increase of the leg is less than the strongest leg.

12. The method of claim 11, further comprising increasing power gain by a substantially same amount for a plurality of legs in the active set having a signal strength between the power reference and the signal threshold value.

13. The method of claim 11, further comprising for each of the plurality of legs in the active set having a signal strength between the power reference and the signal threshold value, increasing power gain substantially in proportion to the leg's signal strength in excess of the signal threshold value.

14. The method of claim 11, further comprising for each of the plurality of legs in the active set having a signal strength between the power reference and the signal threshold value, increasing power gain substantially in proportion to the leg's signal strength below the power reference.

15. The method of claim 11, further comprising:
providing a plurality of power gain ranges between the power reference and the signal threshold value;
placing each of a plurality of legs in the active set in one of the plurality of power gain ranges based on at least one of signal strength above the signal threshold value and signal strength below the power reference; and
increasing power gain by a substantially same amount for one or more of the plurality of legs in each of the power gain ranges.

16. A computer-readable medium containing computer instructions for instructing a processor to perform a method of selective need-based control message augmentation, the instructions comprising:
a network unit of a mobile communication system generating a control message for communication to a mobile unit;
determining a handoff state transition of the mobile unit;
determining a set of signal conditions for one or more legs of an active set associated with the mobile unit; and
the network unit at least one of selectively fast repeating the control message and selectively increasing power gain for the control message based on the handoff state transition and the set of signal conditions:
if the handoff state transition is in a soft handoff state:
out of the active set, setting a strongest leg as a power reference;
increasing power gain of the control message for the strongest leg more than other legs in the active set;
establishing a signal threshold value;
prohibiting power gain increase of the control message in a leg in the active set if signal strength of the leg in the active set falls below the signal threshold value; and
increasing power gain of the control message in the leg if signal strength of the leg in the active set is between the power reference and the signal threshold value, wherein power gain increase of the leg is less than the strongest leg.

* * * * *